(12) United States Patent
Raste et al.

(10) Patent No.: US 9,409,554 B2
(45) Date of Patent: Aug. 9, 2016

(54) METHOD FOR IMPROVING THE DRIVING STABILITY

(75) Inventors: Thomas Raste, Oberursel (DE); Peter Lauer, Karben (DE); Peter E. Rieth, Eltville (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 201 days.

(21) Appl. No.: 14/232,672

(22) PCT Filed: Jul. 18, 2012

(86) PCT No.: PCT/EP2012/064104
§ 371 (c)(1),
(2), (4) Date: Apr. 9, 2014

(87) PCT Pub. No.: WO2013/011058
PCT Pub. Date: Jan. 24, 2013

(65) Prior Publication Data
US 2014/0222272 A1     Aug. 7, 2014

(30) Foreign Application Priority Data

Jul. 19, 2011   (DE) .......................... 10 2011 079 437

(51) Int. Cl.
*B60L 9/00*        (2006.01)
*B60L 11/00*      (2006.01)
(Continued)

(52) U.S. Cl.
CPC ............... *B60T 7/12* (2013.01); *B60K 31/0008* (2013.01); *B60T 8/1755* (2013.01); *B60T 2201/16* (2013.01); *B60T 2210/12* (2013.01); *B60T 2210/36* (2013.01); *Y02T 10/84* (2013.01)

(58) Field of Classification Search
CPC ..... B60T 8/1755; B60T 7/12; B60T 2201/16; B60T 2210/12; B60T 2210/36; B60K 31/0008; Y02T 10/84
USPC ...................................................... 701/22, 70
See application file for complete search history.

(56) References Cited

U.S. PATENT DOCUMENTS 5,563,792 A * 10/1996 Ander ..................... B60T 8/172
                                                          180/197
5,711,023 A    1/1998 Eckert et al.
(Continued)

FOREIGN PATENT DOCUMENTS

DE        102 58 167        7/2003
DE        698 19 984        9/2004
(Continued)

OTHER PUBLICATIONS

International Search Report corresponding to application No. PCT/EP2012/064104, dated Oct. 15, 2012.
(Continued)

*Primary Examiner* — Calvin Cheung
*Assistant Examiner* — Paula L Schneider
(74) *Attorney, Agent, or Firm* — RatnerPrestia

(57) ABSTRACT

The invention relates to a method for improving the driving stability of a motor vehicle in which driver-independent braking interventions are triggered if a critical driving situation is to be expected on the basis of route information and instantaneous position data of the motor vehicle, and to a corresponding system. According to the invention, the driver predefines, via a human/machine interface, information about the maximum coefficient of friction to be utilized, which is used as the basis for the prediction of a critical driving situation.

16 Claims, 6 Drawing Sheets

(51) Int. Cl.
*G05D 1/00* (2006.01)
*G05D 3/00* (2006.01)
*G06F 7/00* (2006.01)
*G06F 17/00* (2006.01)
*B60T 7/12* (2006.01)
*B60T 8/1755* (2006.01)
*B60K 31/00* (2006.01)

(56) References Cited

U.S. PATENT DOCUMENTS

| | | | |
|---|---|---|---|
| 6,208,927 B1* | 3/2001 | Mine | B60K 31/0058 701/70 |
| 8,352,120 B2* | 1/2013 | Craig | B60W 30/02 701/1 |
| 2006/0025895 A1* | 2/2006 | Jansson | B60K 28/16 701/1 |
| 2008/0183353 A1 | 7/2008 | Post et al. | |
| 2010/0106374 A1* | 4/2010 | Miyajima | B60T 8/1755 701/41 |
| 2011/0261168 A1* | 10/2011 | Shima | B60T 7/22 348/47 |
| 2011/0313647 A1* | 12/2011 | Koebler | B60L 15/2045 701/123 |

FOREIGN PATENT DOCUMENTS

| | | |
|---|---|---|
| DE | 10 2004 044 788 | 4/2006 |
| DE | 102008005305 | 7/2009 |
| DE | 102009041580 | 4/2010 |
| EP | 0 792 229 | 9/1997 |
| EP | 1 805 530 | 7/2007 |
| FR | 2913386 | 9/2008 |
| WO | WO 2008/145509 | 12/2008 |

OTHER PUBLICATIONS

German Search Report corresponding to application No. DE 10 2012 212 616.3, dated Mar. 5, 2013.

* cited by examiner

METHOD FOR IMPROVING THE DRIVING STABILITY

CROSS REFERENCE TO RELATED APPLICATION

This application is the U.S. National Phase Application of PCT International Application No. PCT/EP2012/064104, filed Jul. 18, 2012, which claims priority to German Patent Application No. DE 10 2011 079 437.9, filed Jul. 19, 2011, the contents of such applications being incorporated by reference herein.

FIELD OF THE INVENTION

The invention relates to a method for improving the driving stability of a motor vehicle in which driver-independent braking interventions are triggered if a critical driving situation is to be expected on the basis of route information and instantaneous position data of the motor vehicle, and to a system for regulating the driving stability of a motor vehicle, having means for the driver-independent building up of braking forces at one or more wheels of the motor vehicle, means for sensing information about the instantaneous driving state, including a yaw rate sensor and/or steering angle sensor and/or lateral acceleration sensor and/or wheel rotational speed sensors, means for determining the current vehicle position, comprising a GPS receiver, and means for making available route information, comprising a navigation system with digital map data.

BACKGROUND OF THE INVENTION

Modern motor vehicles are often equipped with vehicle movement dynamics control systems such as an ESC (Electronic Stability Control) system which can selectively influence the driving behavior of a motor vehicle. In order to ensure driving stability, i.e. make sure that the vehicle follows the driver's prescriptions, in this context automatic wheel-specific braking forces can be generated and/or the drive torque reduced. The control intervention is derived directly from the driver's inputs (steering, braking, opening the throttle) and takes place in a reactive fashion, wherein an input by the vehicle movement dynamics control does not take place until the driving behavior deviates by a measurable absolute value from the driver's request which is calculated on the basis of a vehicle model. An active vehicle movement dynamics control system is known, for example, from EP 0 792 229 B, which is incorporated by reference.

An increase in the driving safety through proactive or predictive control interventions can take place on the basis of a surroundings sensor system (radar and/or optical cameras) which permits controlling the distance from a vehicle traveling ahead (ACC: Adaptive Cruise Control), the triggering of emergency braking when obstacles are detected (EBA: Emergency Brake Assist) or permits warnings or interventions when lane boundaries are crossed (LDW: Lane Departure Warning).

Currently, approaches for providing a driver with early warning about potentially hazardous bend situations (CSW: Curve Speed Warning) are being trialed. Information about a bend lying ahead is determined by means of digital maps, such as, for example, the geometric characteristic. In this context, the actual position of the vehicle (ego position) is determined on the basis of satellite navigation (GPS: Global Positioning System), solely or in conjunction with an inertial sensor system or inertial navigation system by means of an electronic control device (IPC: Inertial and Position Cluster). Such CSW systems warn the driver if he is approaching a bend too quickly.

For example, DE 10 2009 041 580 A1, which is incorporated by reference, discloses a method for predictively warning about bends, in which method the bend profile is detected by means of surroundings sensors, in particular beam sensors and/or cameras, and is compared with a bend profile based on digital map information, on the basis of which a bend verification signal is generated. A bend warning signal is generated and output as a function of the bend verification signal.

EP 1 805 530 B1, which is incorporated by reference, discloses a method for increasing the driving safety and/or comfort of a motor vehicle in which data from a vehicle control device, which is provided for controlling a safety-increasing function, is logically linked to data of a navigation device or cartographic data, wherein cartographic data is used together with information, acquired directly or indirectly in the vehicle by sensors, relating to the current driving state in order to determine a current hazard value, and wherein interventions into the function groups with safety-increasing functions occur in accordance with the hazard value, wherein, in particular, a visual, acoustic or haptic warning to the vehicle driver is issued in addition to or instead of the intervention.

The coefficient of friction of the road is a decisive parameter for CSW systems or generally for vehicle movement dynamics control systems. For example, it determines the maximum speed at which a bend can be travelled through since it limits the transmissible forces. The coefficient of friction depends on the pairing of the tire on the road and therefore on the instantaneous ambient conditions and is therefore generally not known. A faulty estimation of the coefficient of friction—or even the fundamental adoption of a high coefficient of friction—results in a large risk for the vehicle manufacturer or supplier because an excessively high recommended speed (about which a warning is not given) can lead to recourse claims arising from product liability.

SUMMARY OF THE INVENTION

An aspect of the present invention is to warn the driver in good time about a critical driving situation and/or to initiate stabilization interventions in order, in particular, to reduce further the probability of the vehicle leaving the road compared to known vehicle movement dynamics control systems such as ESC.

A method for improving the driving stability of a motor vehicle is therefore made available in which driver-independent braking interventions are triggered if a critical driving situation is to be expected on the basis of route information and instantaneous position data of the motor vehicle, wherein the driver predefines, via a human/machine interface, information about the maximum coefficient of friction to be utilized, which information is used as the basis for the prediction of a critical driving situation.

The predefinition by the driver avoids an excessively low estimation of the coefficient of friction via possibly faulty sensor data (such as for example the data of a rain sensor). The driver can intentionally decide what measure of interventions into the driving behavior he desires—therefore a sporty driver is not disrupted by braking interventions which are inappropriate from his point of view. On the other hand, a careful driver can also drive without fear even in bad weather conditions such as snow and ice by virtue of the assistance provided by the method according to the invention.

It is advantageous if a coefficient of friction which is required for safely driving along a predetermined route is determined for a predefined distance on the basis of one or more instantaneous driving state variables, in particular the instantaneous velocity, the route information and the instantaneous position data of the motor vehicle, in particular taking into account the minimum bend radius which occurs in the predefined distance and the instantaneous velocity.

The predetermined route can be selected, for example, on the basis of the input destination of a navigation system. Alternatively, it is also possible to determine the most probable route and to select it as a predetermined route. In that a preview for a predefined distance is provided, the driver can be warned sufficiently early in order to be able to react himself and, if appropriate, necessary braking interventions and/or driving interventions can take place gently. On the basis of the place with the minimum bend radius and the instantaneous velocity, the lateral forces which occur can be estimated and therefore the required coefficient of friction determined.

The predefined distance over which the coefficient of friction which is required for safely driving along the predetermined route is preferably selected as a function of the instantaneous velocity. This ensures sufficiently early warning of the driver in the case of high-speed travel of the vehicle, while in the case of low-speed travel no predictions can occur over inappropriately long time periods.

It is particularly advantageous if the driver is informed about the coefficient of friction which is required to safely drive along the predetermined route, in particular by means of a visual display, which preferably additionally makes available information about a weather situation in which a corresponding coefficient of friction is to be expected. the driver can therefore estimate whether he should reduce the velocity or in contrast even can still accelerate.

The driver is expediently informed haptically and/or visually, in particular by means of an accelerator pedal having active restoring forces, if a reduction in the velocity should take place in order to avoid critical driving situations, in particular in order to ensure reliable driving along the predetermined route. In this context is also advantageous that a separate warning takes place if the required coefficient of friction is above the maximum value to be utilized by a predefined threshold value.

According to one preferred embodiment of the invention, a limiting speed for safely driving along the predetermined route is determined for a predefined distance on the basis of the information relating to the maximum coefficient of friction to be utilized, the route information and the instantaneous position data of the motor vehicle, in particular taking into account the minimum bend radius occurring in the predefined distance, wherein the predefined distance over which the coefficient of friction which is required to safely drive along the predetermined route is determined is preferably selected as a function of the instantaneous velocity. The limiting speed which is determined in this way permits rapid and reliable travel to the destination.

According to one particularly preferred embodiment of the invention, the instantaneous velocity is added to the limiting speed in that braking interventions take place at two or more wheels of the motor vehicle and/or the drive torque is reduced. In particular, if the vehicle speed significantly exceeds the limiting speed, a reaction by the driver may occur too late and/or too hesitantly or gently, for which reason driver-independent braking interventions and/or a reduction in the driving torque are carried out in order to reduce the velocity.

According to one particularly preferred embodiment of the invention, the applied braking forces are selected as a function of the difference between the instantaneous velocity and the limiting speed and/or the distance from the point on the route with a minimum bend radius. This permits prompt travel and avoids inappropriately strong braking interventions.

In this context it is advantageous that the applied braking forces are limited and/or the change in the drive torque with respect to the accelerator position is limited, in particular in such a way that the longitudinal deceleration of the vehicle does not exceed a predetermined deceleration threshold value. This limitation of the braking deceleration permits the driving comfort to be increased, wherein, if appropriate, an ESC intervention for applying an additional yaw moment can occur near to the apex point of the curve.

The information which is predefined by the driver and which relates to the maximum coefficient of friction to be utilized is expediently modified on the basis of one or more further independent variables such as the data of a rain sensor and/or current weather information and/or the plausibility of said information is checked, wherein, in particular, a minimum is formed between two independent values. As a result, the maximum coefficient of friction which is predefined by the driver can be adapted in order, for example, to allow for weather conditions which have become worse. This can be determined, for example, on the basis of weather information which is received by radio.

It is advantageous if a first coefficient of friction and a second coefficient of friction are determined on the basis of the information which is predefined by the driver and relates to the maximum coefficient of friction which can be utilized, wherein the first coefficient of friction is smaller than the second coefficient of friction, in that on the basis of the first coefficient of friction it is determined whether an indication is to be given to the driver, and in that on the basis of the second coefficient of friction it is determined whether braking interventions for reducing the vehicle speed have to take place. A warning is therefore provided comparatively early but braking interventions take place only when they are indispensible.

A braking intervention preferably does not occur until the presence of a bend has been confirmed by a steering movement of the driver and/or the setting of a flashing indicator light and/or on the basis of information of a surroundings sensor system, in particular of one or more cameras. By changing the steering angle the driver can confirm that assistance is desired. However, plausibility checking can also be carried out by means of a surroundings sensor system such as radar or cameras.

The motor vehicle preferably has means for controlling the distance from a vehicle traveling ahead and/or means for triggering an emergency braking operation when obstacles are detected on the roadway, wherein the means comprise an electronic control unit which is connected to the surroundings sensor system, and in that the setpoint value of the distance controlling device and/or the minimum distance, the undershooting of which triggers emergency braking, are/is selected and/or modified as a function of the information which is predefined by the driver and relates to the maximum coefficient of friction to be utilized. The method according to the invention can therefore be used to improve existing ACC systems. In this case, the driver sets a maximum coefficient of friction by means of a suitable human/machine interface, and the system intervenes comfortably in order to adapt the velocity to the respective bend. As a result, an ACC control process can make available a further increase in the driving safety beyond merely controlling the distance from the vehicle driving ahead. Furthermore, by avoiding high lateral accelerations which are unpleasant for passengers improved comfort can also be made available. Correspondingly, the intervention distance of an emergency braking assistant can also be modified in accordance with the coefficient of friction which is preselected by the driver, in order to increase the driving safety.

The invention also relates to a system for regulating the driving stability of a motor vehicle, having means for the driver-independent building up of braking forces at one or more wheels of the motor vehicle, means for sensing information about the instantaneous driving state, in particular a yaw rate sensor and/or steering angle sensor and/or lateral acceleration sensor and/or wheel rotational speed sensors, means for determining the current vehicle position, in particular a GPS receiver, and means for making available route information, in particular a navigation system with digital map data, and a human/machine interface for inputting information on the maximum coefficient of friction to be utilized, in particular a switch. The system preferably comprises an electronic control device which carries out a method according to the invention.

The system expediently comprises means for haptically and/or visually informing the driver about a critical situation to be expected, in particular an accelerator pedal having active restoring forces, and preferably means for estimating a coefficient of friction which is required to safely drive along a predefined route.

It is advantageous if the system has means for regulating the distance from vehicles traveling ahead and/or means for regulating the vehicle speed, wherein the one or more means comprise an electronic control device which is connected to a surroundings sensor system, preferably one or more cameras.

The system preferably comprises means for modifying the chassis, in particular active shock absorbers and/or active roll stabilizers and/or a superimposition steering system at the front axle and/or a rear-axle steering system. As a result, these additional active actuating elements, which can bring about an improvement in the driving behavior in a bend, are actuated when a bend is approached or included in the driving stability control.

In addition, the invention relates to use of a system according to the invention in a motor vehicle which is at least temporarily driven by one or more electric motors. In this context, it is also possible to select in hybrid vehicles an adapted braking strategy in which the braking is carried out by means of a drag torque of the electric motors which are operated as a generator.

According to one preferred embodiment of the invention, when traveling out of a bend the vehicle is accelerated to the velocity which corresponds to the position of the accelerator pedal (which the vehicle therefore had before the braking intervention). This can be done, in particular, using regenerated electrical energy by means of one or more electric motors.

Further preferred embodiments can be found in the dependent claims and the following description of an exemplary embodiment with reference to figures.

DETAILED DESCRIPTION OF THE PREFERRED EMBODIMENT

Figure 1:
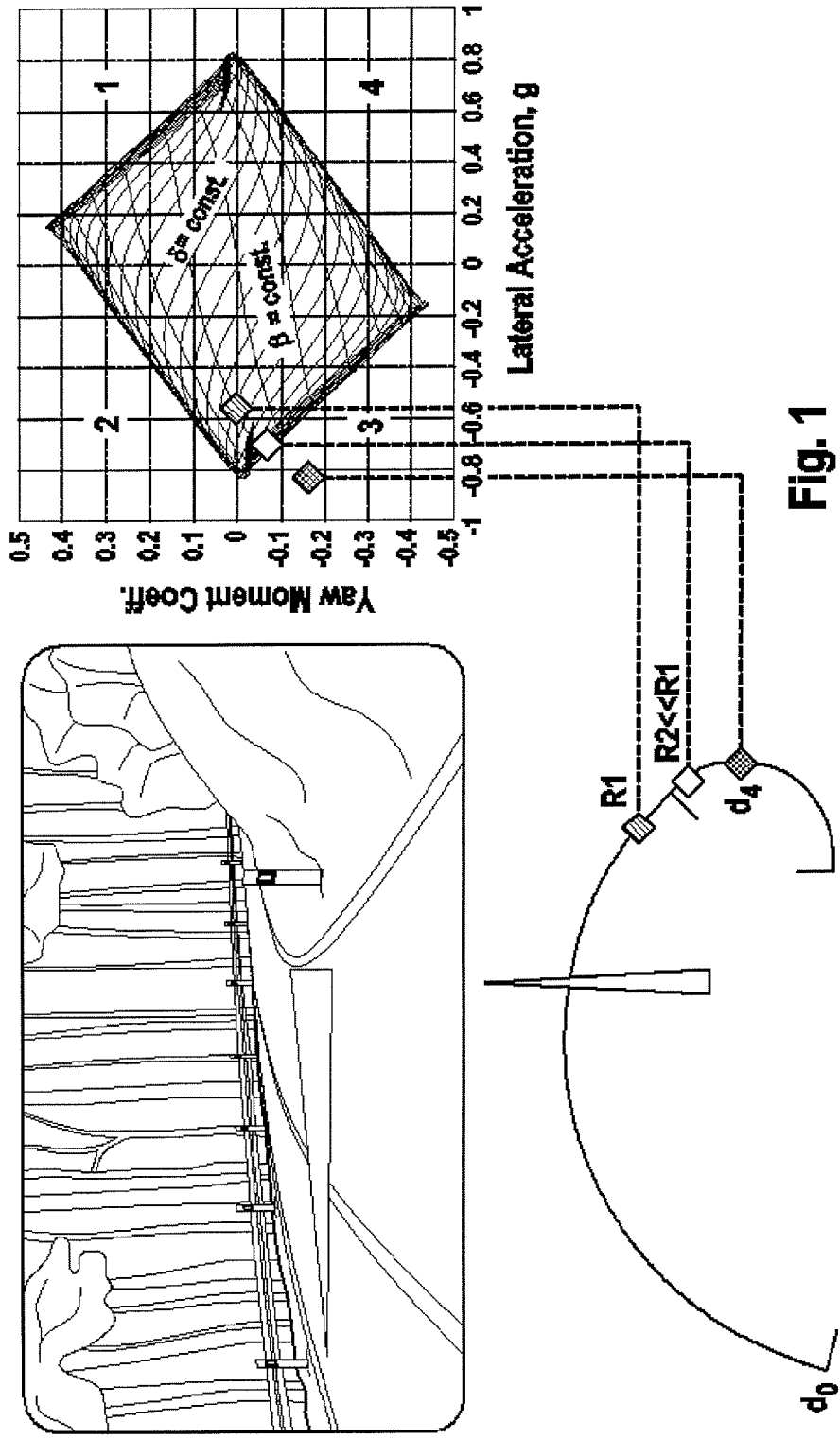
FIG. 1 shows a diagram of the relationship between the bend geometry and the vehicle movement dynamics potential.

A subject matter of the invention comprises a method and a system for improving the driving stability with information about the future road profile. According to the invention, the driver estimates the environmental conditions himself and selects a suitable predefinition for the coefficient of friction via a suitable human/machine interface (HMI). According to one preferred embodiment of the invention, this predefinition is made by means of a switch or pushbutton key which limits the maximum coefficient of friction which can be utilized to a permanently predefined value. According to one further preferred embodiment of the invention, the driver predefines, by means of a selection switch, the possible conditions of dry/wet/snow/ice himself, wherein the conditions are respectively assigned a corresponding coefficient of friction. According to one alternative preferred embodiment of the invention, the driver can select whether a sporty, a normal or a comfortable intervention strategy is to be adopted. In principle, other embodiments such as a combination of a preselection of the coefficient of friction and selection of the intervention strategy are also conceivable. The use of a touch screen as an HMI is possible.

According to one preferred embodiment of the invention, which can also be combined with the above-mentioned ones, a maximum coefficient of friction (for example $\mu=0.5$) is predefined and reconciled with the coefficient of friction set by the driver and, if appropriate, with the coefficient of friction determined during an intervention by an ESC system, wherein, in particular, minimum value formation takes place.

The coefficient of friction (or the limited value determined by reconciliation) selected by the driver preferably defines here not only the maximum lateral acceleration in the bend but also limits expediently the yaw rate reference speed and makes the ESC more sensitive, as a result of which the vehicle is therefore influenced in the direction of an understeering and therefore stable behavior. It is also advantageous to precondition the ESC system as a function of the respective setting by lowering the coefficient of friction for the calculation of the yaw rate reference speed. Alternatively or additionally, the ESC activation thresholds can also be adapted in accordance with the preselected coefficient of friction.

The method and system expediently comprise one or more of three parts which preferably build one on the other:
1. determining the vehicle movement dynamics potential of the vehicle,
2. warning strategy, and
3. intervention strategy.

The vehicle movement dynamics potential is preferably quantified on the basis of a stability index which can be determined on the basis of measured or estimated speed signals (yaw rate, vehicle speed, side slip angle) and/or force signals (longitudinal force, lateral force, yaw moment or corresponding accelerations). For the method according to the invention it is in principle irrelevant whether the vehicle movement dynamics potential is determined on the basis of kinematic variables or dynamic variables—in this context it is possible to take into account which variables can be made available by a vehicle movement dynamics control system with minimum expenditure.

FIG. 1 shows a diagram of the relationship between the bend geometry and the vehicle movement dynamics potential. The radius of a bend to be driven through is preferably determined from data of a navigation system. In this case, instantaneous bend radii are preferably considered at a plurality of points of the bend and, in particular, the minimum bend radius which occurs is determined. The entry of the vehicle into the bend is denoted by $d_0$, the exemplary bend extends up to the apex point $d_4$, after which the bend radius remains constant. On the basis of the instantaneous driving state variables, in particular velocity, the yaw acceleration (or the yaw moment) which is required to travel through the bend and the lateral acceleration are determined and compared with the maximum values made available by the vehicle. These are generally influenced, for example, by the presence of a rear-axle steering system or generally by the configuration of the chassis and quite substantially determined by the coefficient of friction which is present. Given a fixed, pre-defined coefficient of friction, for example a bend with a radius R1 is clearly within the noncritical range in terms of the driving stability, while a bend with the radius R2<R1 is at the edge of driving stability, i.e. under the given conditions the bend can just still be driven through without a loss of driving stability. In the case of bends with a still smaller bend radius, the critical driving situation would occur, for which reason the driver should be warned and a stabilization intervention should take place.

Figure 2:
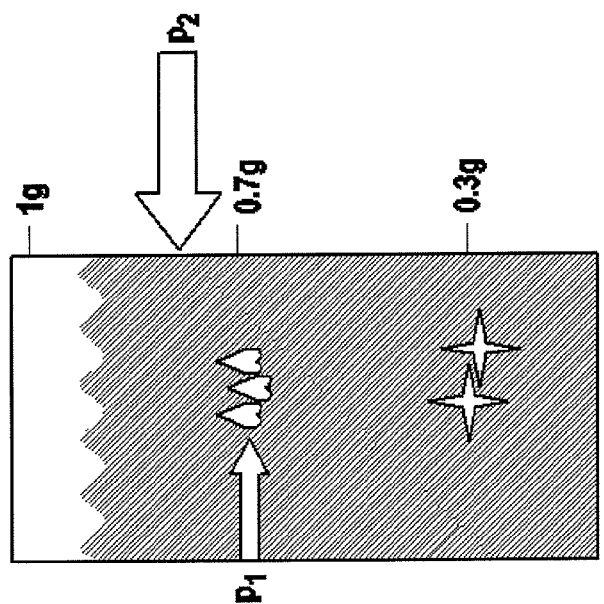
FIG. 2 shows an exemplary display for warning the driver.
Figure 2:
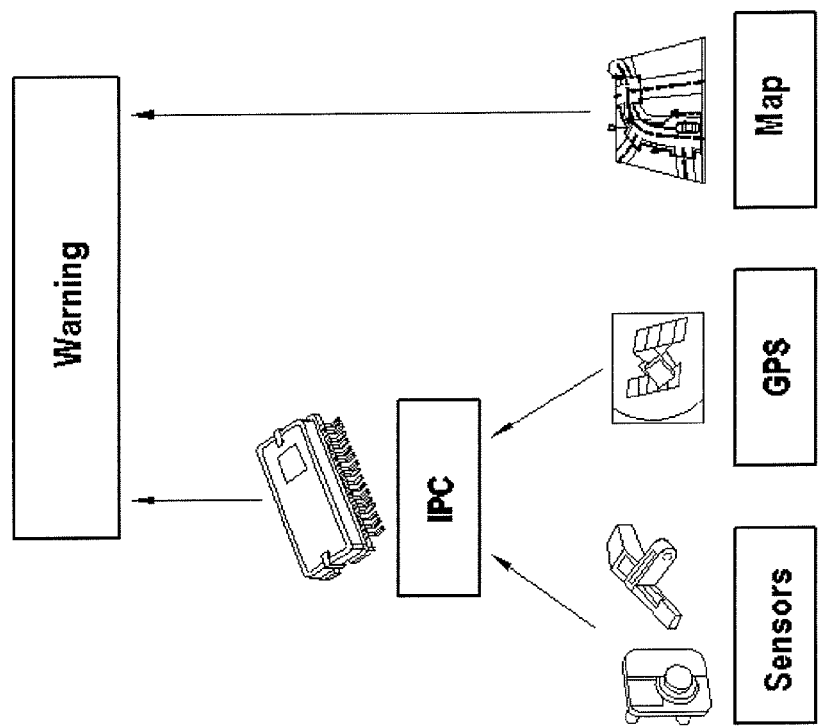

FIG. 2 shows an exemplary embodiment of a strategy or of a display for warning the driver about a critical situation. The necessary road conditions are expediently displayed to the driver in order to pass safely through the bend lying ahead at the current speed. The coefficient of friction which is required to avoid critical driving situations and/or the required weather conditions for driving through the next bend at the current vehicle speed are preferably displayed by means of an arrow $p_2$. In addition to this, it is particularly advantageous to indicate, in particular by means of an arrow $p_1$, the maximum coefficient of friction which is pre-selected by the driver. For example, in a display the arrow $P_2$ is set to "dry" if driving through the next bend at the current vehicle speed would give rise to lateral acceleration greater than 1 g (with the acceleration due to gravity g=9.81 m/s$^2$), or is set to "snow" if the expected lateral acceleration is 0.3 g. As a result, the driver can estimate whether the speed should be reduced in order to avoid a critical driving situation or whether even an increase in the speed is noncritical.

The warning strategy therefore preferably comprises a assistance of the driver in selecting a vehicle speed which is adapted to the current coefficient of friction. In this context, information from sensors (sensors) which characterize the driving state and from a GPS receiver (GPS) are, if appropriate, evaluated in conjunction with inertia navigation in an electronic control device (IPC) in order to determine the vehicle position and the current driving state (in particular the vehicle speed). A warning is issued on the basis of information, determined by means of a digital map, about the most probable future course of the vehicle if the occurrence of a critical driving situation, during which the vehicle no longer follows the prescriptions of the driver, is to be expected. In addition to the display of the required coefficient of friction, an additional warning is expediently issued to the driver if the vehicle is moving toward a bend at an excessively high speed and, given the selected pre-setting, a conflict arises with respect to the coefficient-of-friction-dependent bend limiting speed and the bend limiting speed determined using, for example, map data.

In order to improve driving safety further, the active vehicle movement dynamics control systems can be prepared for an intervention by, in particular, lowering the activation thresholds. In addition, a further acceleration of the vehicle can be prevented or a selective braking intervention can be carried out. If the vehicle has active shock absorbers and/or active roll stabilizers and/or a superimposition steering system at the front axle and/or a rear-axle steering system, these additional active actuation elements can be actuated in order to bring about an improvement in the driving behavior in the bend.

Figure 3:
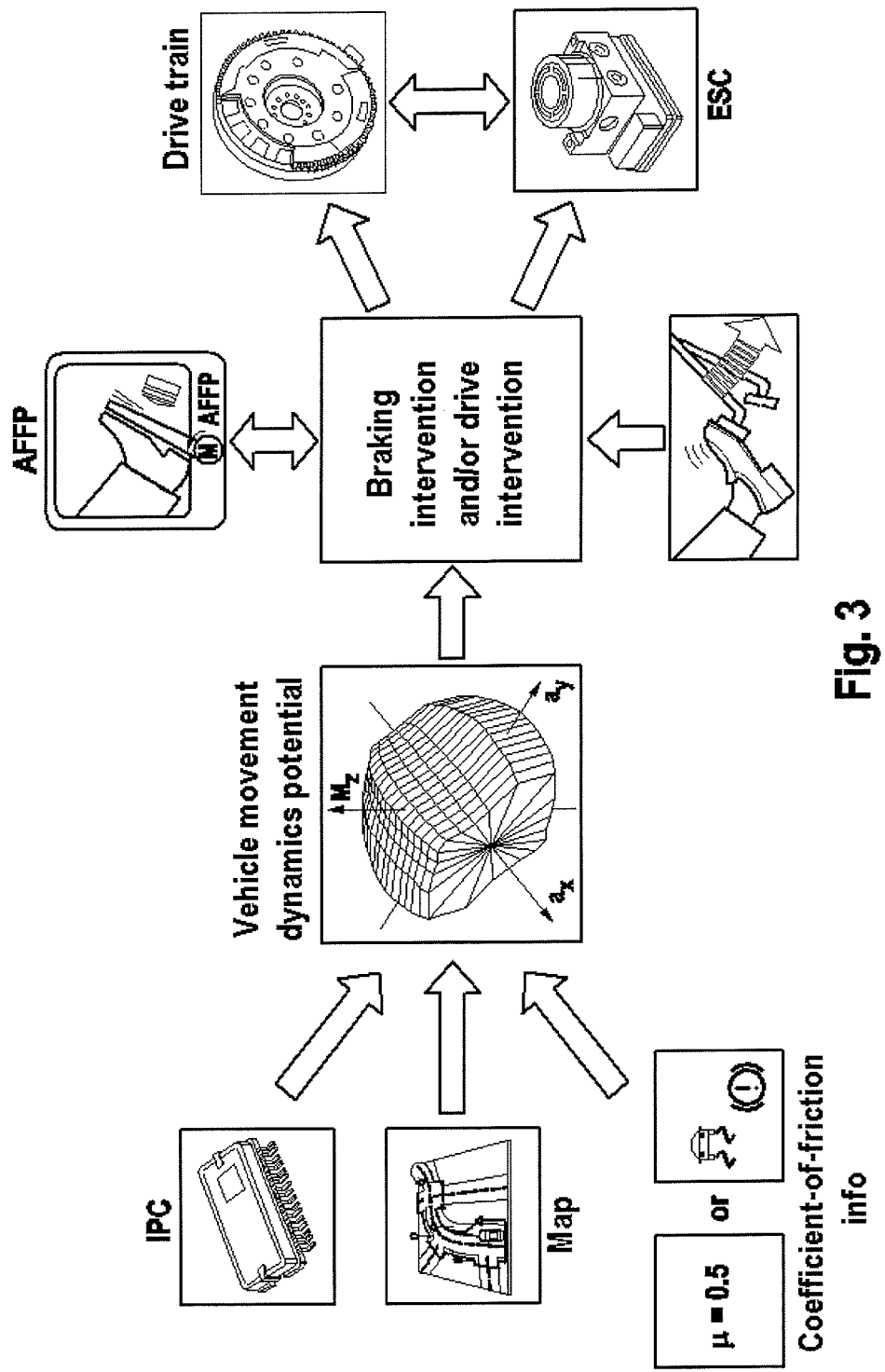
FIG. 3 shows a general schema relating to the invention strategy.

FIG. 3 shows an example of an intervention strategy according to the invention. The position data of the vehicle are determined in an electronic control device (IPC) by means of inertia navigation and/or data of a GPS receiver, and the relevant information about the future course of the vehicle is determined on the basis of a digital map, and the instantaneously present coefficient of friction (coefficient-of-friction information) is determined by means of driver prescriptions, possibly supplemented by sensor data and/or an estimate of the coefficient of friction by vehicle movement dynamics control systems which are known per se. An expected critical situation is detected by means of a comparison of the possible vehicle movement dynamics potential of the vehicle with that for the imminent course. Subsequently, an adaptive drag torque control and/or braking torque control (braking intervention and/or drive intervention) take place, wherein, in particular, the intervention time and intensity of the invention are selected in accordance with the comparison result. The driver is preferably informed haptically of the risk by the feedback of an accelerator pedal with active feedback. The interventions are requested or carried out by an electronic brake control device (ESC) and/or an engine controller (drive train).

The intervention strategy is expediently dependent on the reactions of the driver. If the driver does not reduce his speed, he can be prompted to close the throttle using an active accelerator pedal (AFFP: Active Force Feedback Pedal). If the driver releases the accelerator pedal, the drag torque can be selectively adapted, with the result that the vehicle is decelerated to the target speed up to the apex point of the bend. In the case of electric vehicles or hybrid vehicles, according to one particularly preferred embodiment of the invention a corresponding adaptive strategy is applied for regenerative braking. If the driver activates the brake pedal, a selective increase in the braking effect occurs, in particular on a wheel-specific basis.

Figure 4:
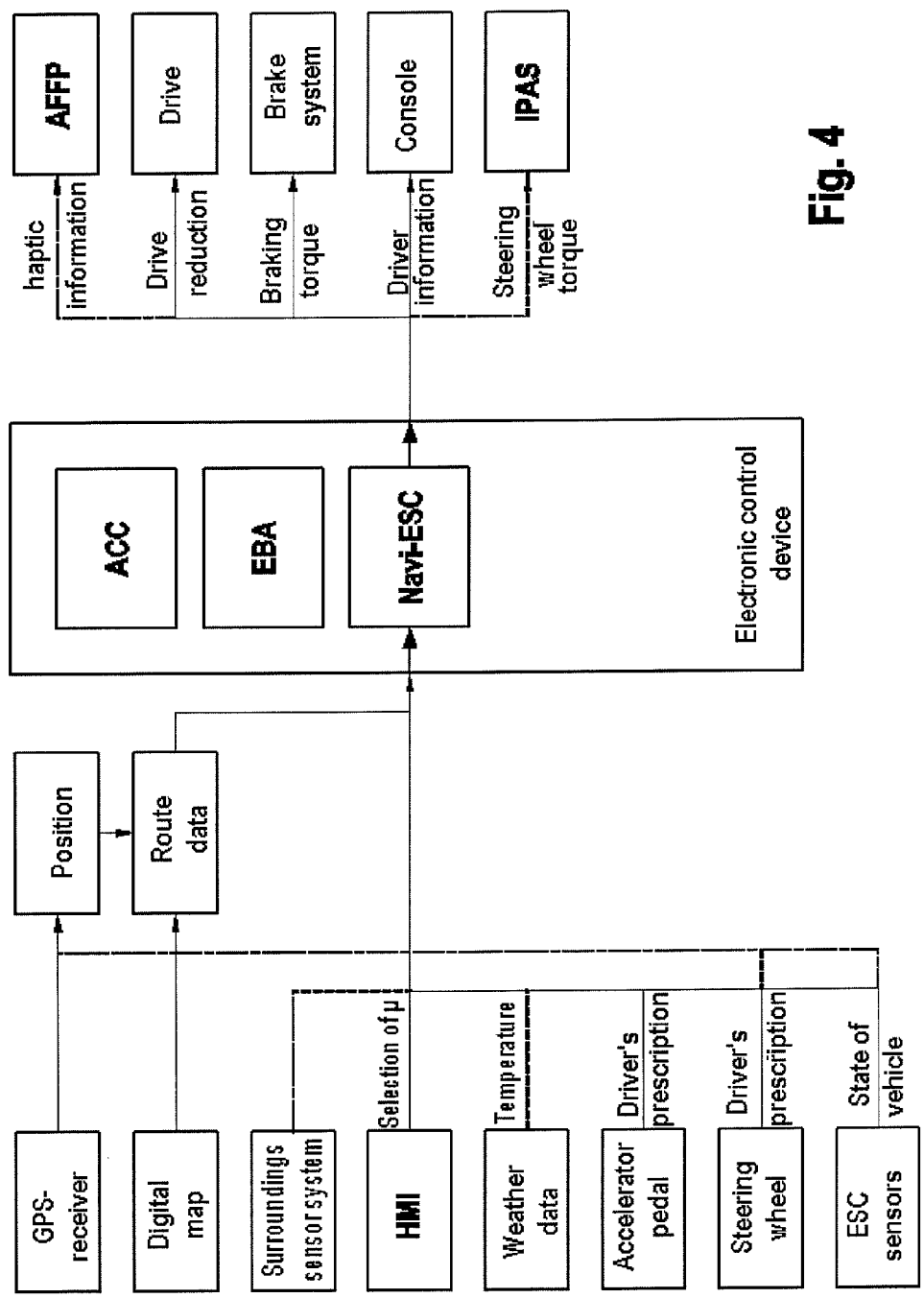
FIG. 4 shows a schematic overview of an exemplary system for controlling the driving stability.

FIG. 4 shows a schematic overview of an exemplary system for controlling the driving stability in which, in the left-hand column, sensors or interfaces are illustrated via which information about the current driving situation and the prescriptions of the driver are received; in the center, the functions which are made available by one or more electronic control devices are indicated, while in the right-hand column actuators or means for informing the driver (such as a display) are illustrated. The signal flow is illustrated with continuous arrows, wherein additionally optional signals are indicated by dashes.

The position of the vehicle is determined by means of satellite navigation. The information of the ESC sensors such as, for example, yaw rate and lateral acceleration and/or information of a surroundings sensor system, i.e. of one or more cameras, can also additionally be taken into account in the determination of positions. In this context, "map matching" algorithms, that is to say the reconciliation with information of a digital map (as described, for example, in WO 2008/145509 A1), which is incorporated by reference, can be used.

By using the surroundings sensor system it is possible to implement functions such as an automatic control with respect to the distance from vehicles traveling ahead (ACC: Automatic Cruise Control) or an emergency braking assistant (EBA: Emergency Brake Assist).

The system makes available a human/machine interface via which the driver inputs information about the maximum coefficient of friction which is to be utilized. This may be, for example, a switch whose activation limits the maximum coefficient of friction to be utilized to a predefined value between 0.9 and 0.1 (preferably 0.3). This prescribes, in particular, the maximum lateral acceleration which occurs.

If the vehicle has sensors or interfaces for receiving weather data, the plausibility of the maximum coefficient of friction predefined by the driver can be checked and/or said coefficient of friction can be modified. This may involve, for example, a thermometer for measuring the outside temperature, a rain sensor or a receiver for weather data (TMC).

The system has sensors which sense prescriptions of the driver via the steering wheel and accelerator pedal, that is to say for example a steering wheel angle sensor. The data of ESC sensors, which are often present in any case in modern vehicles and which measure, in particular, the yaw rate of the vehicle, the lateral acceleration and the wheel speeds, are also taken into account.

Route data or route information are determined on the basis of the position of the vehicle and digital map data and is fed to an electronic control device for making available the Navi-ESC functions. These can act longitudinally or laterally on the vehicle, i.e. influence the longitudinal dynamics or lateral dynamics. The electronic control device can also have further functions—an automatic cruise controller ACC and an emergency brake assist EBA are illustrated by way of example. The electronic control device expediently also makes available functions such as a brakes controller and a vehicle movement dynamics controller.

If a critical driving situation is to be expected on the basis of the instantaneous vehicle speed, the coefficient of friction which can be utilized and route information, because the coefficient of friction which can be utilized is not adequate for applying the lateral forces required to drive through the next bend at the current speed, the Nav-ESC firstly intervenes longitudinally: the vehicle is braked by braking interventions at one or more axles of the motor vehicle before the apex point of the bend, at which the local bend radius is at a minimum, is reached, as a result of which the lateral forces which occur are reduced.

In addition, a Navi-ESC can apply wheel-specific braking forces at one or more wheels of the motor vehicle, i.e. can influence the lateral dynamics, in order to ensure that the setpoint path which is determined on the basis of the driver's prescriptions and map data is driven along. This permits a safe driving behavior to be made available even if adequate braking of the vehicle before the apex point of the bend is driven through is not possible, for example owing to prescriptions regarding the maximum permissible deceleration.

Furthermore, in order to inform and/or assist the driver it is possible to apply a steering wheel torque to an electronic power steering system (IPAS) and/or haptic information can be provided by means of modified restoring forces of an active accelerator pedal (AFFP) insofar as the corresponding actuators are present.

If a critical driving situation is to be expected on the basis of the current information, the driver is informed visually and/or acoustically of the danger, for example by a signal lighting up in the console, a head-up display, a signal tone or a voice output.

The Navi-ESC can request a reduction in the drive torque or a drive reduction and/or the building up of braking torque at one or more wheels of the vehicle. The brake system can have hydraulic wheel brakes, electromechanical wheel brakes and/or one or more generators for applying a drag torque, which can be actuated correspondingly.

Figure 5:
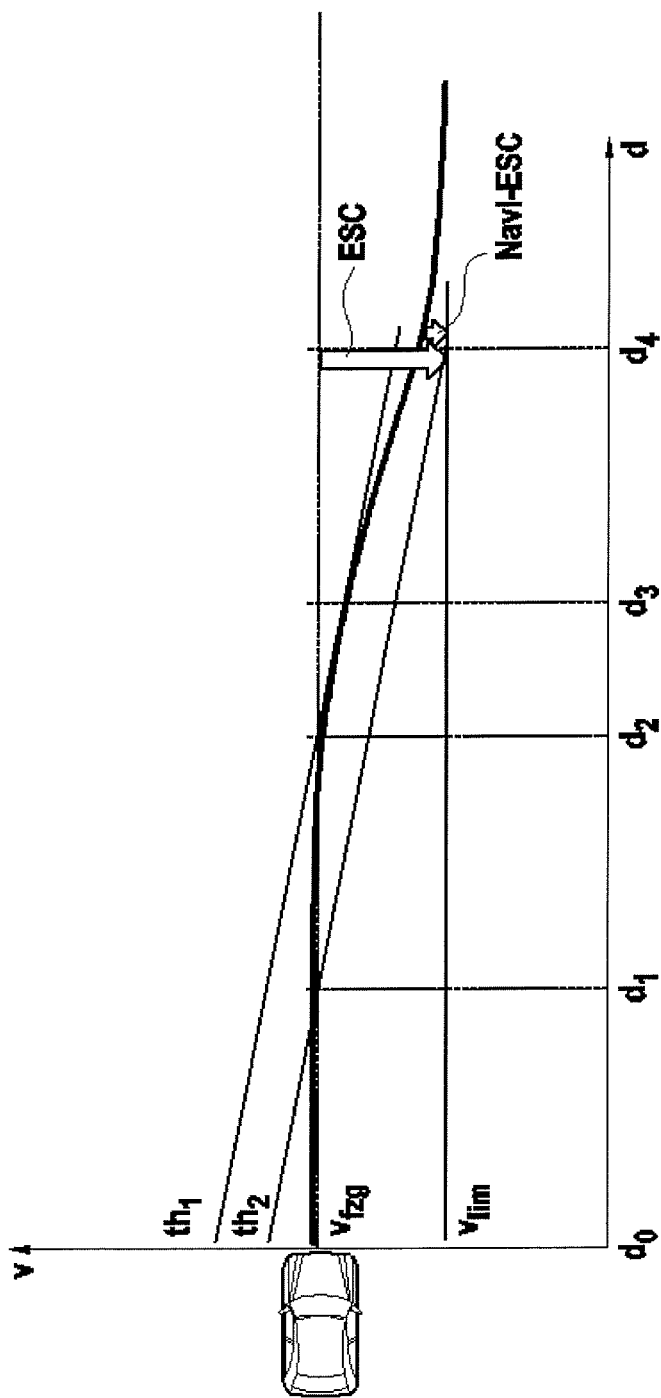
FIG. 5 shows a first exemplary embodiment of the method according to the invention.

A first exemplary embodiment of the method according to the invention is shown in FIG. 5. In this context, the speed of the vehicle $v_{fzg}$ is illustrated as a function of the distance d driven along in a diagram. Given the predefined coefficient of friction, it is possible to drive safely through the bend at a limiting speed $v_{lim}$.

The vehicle enters, at the point $d_0$, a bend, which is firstly curved to a large extent and extends toward the apex point $d_4$, i.e. the bend radius decreases. In this exemplary embodiment, the driver is warned if the velocity exceeds a warning threshold value $th_2$. The limiting speed has to be maintained at the apex point of the bend at which the minimum local bend radius is present. For this reason, the warning threshold value $th_2$ increases as the apex point is approached. Furthermore, braking interventions occur when the velocity exceeds an intervention threshold value $th_1$. The latter is higher than the warning threshold value in order to avoid incorrect intervention; it also decreases as the distance from the apex point drops.

If the vehicle travels through the bend, a warning to the driver is therefore triggered at point $d_1$. This can occur, for example, by an active accelerator pedal shaking or by means of a visual display. If the vehicle continues to move with an unchanged speed, a braking intervention takes place at point $d_2$ in order to set the velocity at the limiting speed.

According to an alternative strategy, a braking intervention does not take place until the intervention threshold value is exceeded and the driver changes the steering angle by more than a predefined steering threshold value, which takes place at point $d_3$ in this example. This alternative strategy reduces the probability of incorrect interventions since the changing of the steering angle by the driver is expected as a confirmation. However, relatively stronger braking interventions are then necessary as a result of the relatively late start of intervention.

In the illustrated example, the maximum permissible vehicle deceleration is limited, for which reason the limiting speed was still slightly exceeded at the apex point $d_4$. For this reason, a wheel-specific braking intervention additionally occurs in order to apply an additional yaw torque, the intensity of which is indicated with the arrow Navi-ESC. A conventional vehicle movement dynamics control system would, in contrast, not intervene until after a significant deviation between the setpoint course and the actual course, for this reason a strong and uncomfortable intervention has to take place—this is indicated, for example, by the arrow ESC. The described strategy therefore increases both the safety and the driving comfort.

Figure 6:
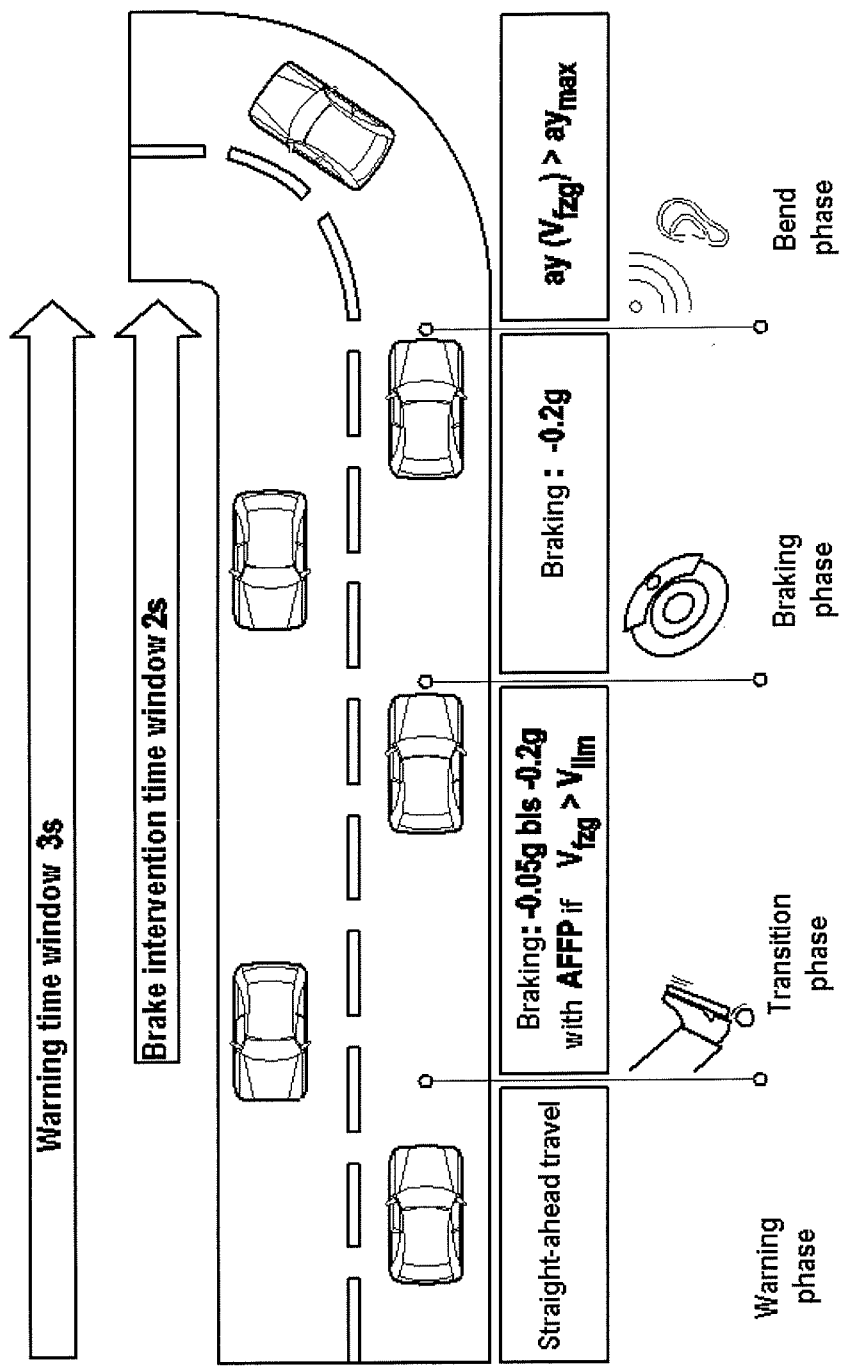
FIG. 6 shows a second exemplary embodiment of the method according to the invention.

FIG. 6 shows a second exemplary embodiment of the method according to the invention. In this context, the driver can select one of three intervention strategies, which are referred to, for example, as sport (S), normal (N) or comfort (C). Depending on the mode or intervention strategy selected, the maximum coefficient of friction to be utilized decreases from 0.7 (S) to 0.15 (C) via 0.25 (N). A vehicle which approaches a bend is indicated in the figure, it being possible to differentiate four phases, a warning phase, a transition phase, a braking phase and a bend phase. Which action is carried out in the respective phase is dependent here on the selected mode.

When a bend is approached (that is to say while the vehicle is still driving straight ahead) in a first phase, the warning phase, the driver is informed about an imminent For example, this warning relates to a travel interval extending 3 s into the future (or alternatively a predefined distance).

In a second phase, the transition phase, a haptic warning is issued to the driver by means of an active accelerator pedal (AFFP) if the velocity $V_{fzg}$ exceeds the limiting speed $V_{lim}$. In the comfort mode (C), in this phase automatic reduction of the driving torque is performed, while in the normal mode (N) the vehicle is not decelerated until after the accelerator pedal is released, and in the sporty mode (S) in this phase no braking intervention takes place. For example, the autonomous braking intervention or drive intervention can take place within a braking intervention time window of 2 s before the bend.

In a third phase, the braking phase, the vehicle is decelerated with a predefined deceleration which is expediently selected as a function of the mode, for example −0.2 g (S), −0.15 g (N) and −0.1 g (C). If appropriate, a dedicated warning light can also issue an additional warning if, despite a braking intervention, there is a risk of a critical driving situation owing to a very high speed.

If the velocity $v_{fzg}$ is also still so high in the bend phase or near to or at the apex point that the lateral acceleration $ay(v_{fzg})$ is higher than the maximum permissible lateral acceleration $ay_{max}$ resulting from the predefined coefficient of friction, wheel-specific braking interventions can be carried out by means of an ESC system. In this context it is expedient to pre-condition the ESC system or the vehicle movement dynamics controller, for example by adapting the thresholds.

In principle, another number of different modes or a direct pre-selection of a fixed coefficient of friction would also be possible, wherein the strategy is preferably adapted depending on the magnitude of the pre-selected coefficient of friction.

Furthermore, the coefficient of friction which is predefined by the driver can be adapted on the basis of further information, wherein, in particular, weather data received by radio (referred to here as a weather report (TMC)) can be taken into account. Depending on the mode pre-selected by the driver it is possible to select the degree of adaptation suitably here.

For example, the maximum coefficient of friction to be utilized for the sporty pre-setting can be lowered to a greater extent if snow or ice is predicted than a coefficient of friction which is already preselected at a low value for the comfort pre-setting.

Alternatively, the maximum coefficient of friction to be utilized can also be adapted on the basis of the measured outside temperature, wherein, in particular given a temperature with a risk of snow or ice (for example below 4° C.) the maximum coefficient of friction to be utilized can be reduced by a fixed predefined value.

In one embodiment of the invention, it is also possible to provide for the pre-selected coefficient of friction to be varied as a function of the position of the accelerator pedal and the current ambient conditions (such as the outside temperature or the humidity), in particular by predefining a characteristic curve. In this context an exemplary strategy may comprise dispensing with braking interventions completely if the driver selects a sporty mode and an outside temperature of above 7° C. is detected.

According to a further preferred embodiment of the invention, the driver can predefine a low coefficient of friction to the system in order to drive into bends comfortably. The system then performs the speed adaptation automatically and comfortably. Very strong "opening of the throttle", that is to say activation of the accelerator pedal which exceeds a predefined threshold value, can cause the speed adaptation to be "overridden" in that the driver increases the prescription for the coefficient of friction by a predefined absolute value (similarly to a "kick down" function of an automatic transmission). In this embodiment, the human/machine interface therefore comprises two operator control elements, a switch or a touchscreen for predefining a first coefficient of friction, and the accelerator pedal (for example "fully depressing" the accelerator pedal) for predefining a second coefficient of friction or an increase absolute value.

The method according to the invention permits the safety to be increased particularly in bends with poor visibility for the driver. Inappropriate interventions can be avoided by virtue of the fact that plausibility checking is expediently carried out of the predefined coefficient of friction and/or the presence of a bend on the basis of further information such as an outside temperature and/or data of a surroundings sensor system and/or said coefficient of friction is modified.

The invention claimed is:

1. A method for improving the driving stability of a motor vehicle comprising:
    enabling a driver to predefine, via a human/machine interface, information about a maximum coefficient of friction;
    determining an expected coefficient of friction on the basis of route information and instantaneous position data of the motor vehicle;
    comparing the expected coefficient of friction with the maximum coefficient of friction predetermined by the driver;
    predicting whether a critical driving situation is to be expected on the basis of a result of the comparison of the expected coefficient of friction with the maximum coefficient of friction predetermined by the driver; and
    triggering a driver-independent braking intervention if the critical driving situation is to be expected.

2. The method as claimed in claim 1, further comprising determining a coefficient of friction which is required for safely driving along a predetermined route for a predefined distance on the basis of one or more instantaneous driving state variables, including instantaneous velocity, the route information and the instantaneous position data of the motor vehicle, taking into account a minimum bend radius which occurs in the predefined distance and the instantaneous velocity, wherein the predefined distance over which the coefficient of friction which is required for safely driving along the predetermined route is selected as a function of the instantaneous velocity.

3. The method as claimed in claim 2, further comprising informing the driver about the coefficient of friction which is required to safely drive along the predetermined route, in particular by a visual display, which additionally makes available information about a weather situation in which a corresponding coefficient of friction is to be expected.

4. The method as claimed in claim 2, further comprising determining a limiting speed for safely driving along the predetermined route for the predefined distance on the basis of the information relating to the maximum coefficient of friction to be utilized, the route information and the instantaneous position data of the motor vehicle, taking into account the minimum bend radius occurring in the predefined distance, wherein the predefined distance over which the coefficient of friction which is required to safely drive along the predetermined route is determined is selected as a function of the instantaneous velocity.

5. The method as claimed in claim 4, further comprising adding the instantaneous velocity to the limiting speed such that at least one of braking interventions take place at two or more wheels of the motor vehicle and the drive torque is reduced.

6. The method as claimed in claim 5, further comprising selecting the applied braking forces as a function of at least one of the difference between the instantaneous velocity and the limiting speed and the distance from the point on the route with the minimum bend radius.

7. The method as claimed in claim 5, further comprising limiting at least one of the applied braking forces and the change in the drive torque with respect to the accelerator position, in such a way that the longitudinal deceleration of the vehicle does not exceed a predetermined deceleration threshold value.

8. The method as claimed in claim 1, further comprising informing the driver at least one of haptically and visually, by an accelerator pedal having active restoring forces, if a reduction in the velocity should take place in order to avoid critical driving situations, in order to ensure reliable driving along the predetermined route.

9. The method as claimed in claim 1, further comprising modifying the information which is predefined by the driver and which relates to the maximum coefficient of friction to be utilized on the basis of one or more further independent variables such as at least one of data of a rain sensor and current weather information, and checking the plausibility of said information, wherein, a minimum is formed between two independent values.

10. The method as claimed in claim 1, further comprising triggering a braking intervention when the presence of a bend has been confirmed by at least one of a steering movement of the driver, the setting of a flashing indicator light, and information of a surroundings sensor system, comprising one or more cameras.

11. The method as claimed in claim 1, further comprising at least one of controlling the distance from a vehicle traveling ahead and triggering an emergency braking operation when obstacles are detected on the roadway, wherein the controlling or the triggering is performed by an electronic control unit which is connected to the surroundings sensor system, and the setpoint value of the distance controlling device or the minimum distance, the undershooting of which triggers emergency braking, are/is selected or modified as a function of the information which is predefined by the driver and relates to the maximum coefficient of friction to be utilized.

12. A system for regulating the driving stability of a motor vehicle, having an electronic control device configured to control the driver-independent building up of braking forces at one or more wheels of the motor vehicle, one or more sensors for sensing information about the instantaneous driving state, including at least one of a yaw rate sensor, a steering angle sensor, a lateral acceleration sensor, and wheel rotational speed sensors, a GPS receiver for determining the current vehicle position, and a navigation system with digital map data for making available route information, wherein a human/machine interface for inputting information on the maximum coefficient of friction to be utilized, in particular a switch and wherein the electronic control device carries out a method as claimed in claim 1.

13. The system as claimed in claim 12, wherein the control device is further configured to at least one of haptically and visually inform the driver about the critical situation to be expected, including an accelerator pedal having active restoring forces, and estimate a coefficient of friction which is required to safely drive along a predefined route.

14. The system as claimed in claim 12, wherein the control device is further configured to regulate at least one of the distance from vehicles traveling ahead and the vehicle speed, wherein the control device is connected to a surroundings sensor system including one or more cameras.

15. The system as claimed in claim 12, further comprising at least one of active shock absorbers, active roll stabilizers, a superimposition steering system at the front axle, and a rear-axle steering system.

16. Use of a system according to at least claim 12, in a motor vehicle which is at least temporarily driven by one or more electric motors.

* * * * *